(12) United States Patent
Yamamoto et al.

(10) Patent No.: US 9,734,641 B2
(45) Date of Patent: Aug. 15, 2017

(54) DRIVING ANALYZER AND DRIVING ANALYZING METHOD FOR HAULAGE VEHICLES

(71) Applicant: KOMATSU LTD., Minato-ku, Tokyo (JP)

(72) Inventors: Yasuko Yamamoto, Hitachinaka (JP); Kazuomi Mito, Hitachinaka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 196 days.

(21) Appl. No.: 14/423,238

(22) PCT Filed: Mar. 12, 2014

(86) PCT No.: PCT/JP2014/056539
§ 371 (c)(1),
(2) Date: Feb. 23, 2015

(87) PCT Pub. No.: WO2015/136647
PCT Pub. Date: Sep. 17, 2015

(65) Prior Publication Data
US 2016/0253853 A1    Sep. 1, 2016

(51) Int. Cl.
*B60L 1/00*      (2006.01)
*G07C 5/08*      (2006.01)
(Continued)

(52) U.S. Cl.
CPC ........... *G07C 5/0841* (2013.01); *G06Q 10/06* (2013.01); *G06Q 50/30* (2013.01)

(58) Field of Classification Search
CPC ......... G07C 5/0841; G07C 5/085; E02F 9/26; G01G 19/083; G01G 1/20; G08G 1/20; B60L 1/00
See application file for complete search history.

(56) References Cited

U.S. PATENT DOCUMENTS 5,327,347 A * 7/1994 Hagenbuch ............. G08G 1/20
                                                    701/29.4
6,546,363 B1 * 4/2003 Hagenbuch ............. G07C 5/085
                                                    177/25.14
(Continued)

FOREIGN PATENT DOCUMENTS

JP    H11-125534 A    5/1999
JP    2008217559 A    9/2008
(Continued)

OTHER PUBLICATIONS

International Preliminary Report on Patentability dated Sep. 13, 2016 from International Application No. PCT/JP2014/056539, 5 pages.
(Continued)

*Primary Examiner* — Yuri Kan
(74) *Attorney, Agent, or Firm* — Fish & Richardson P.C.

(57) ABSTRACT

A driving analyzer for a haulage vehicle includes: a data loader acquiring a cycle data set each time when the haulage vehicle travels the route back and forth and storing the cycle data set in a memory, the cycle data set including: position information of the traveling haulage vehicle; and driving information including information about fuel consumption and load amount; a data extractor extracting reference cycle data set and analysis-target cycle data set from a plurality of cycle data sets in the memory; a section extractor dividing the route into a plurality of sections based on the position information and extracting an analysis-target section therefrom; and a driving information output unit outputting a part of the driving information regarding the analysis-target section according to each of the reference cycle data set and the analysis-target cycle data set.

13 Claims, 14 Drawing Sheets

(51) Int. Cl.
*G06Q 50/30* (2012.01)
*G06Q 10/06* (2012.01)

(56) References Cited

U.S. PATENT DOCUMENTS

| | | | | |
|---|---|---|---|---|
| 6,917,846 | B1* | 7/2005 | Muller | G01G 19/083 |
| | | | | 700/108 |
| 2009/0063226 | A1 | 3/2009 | Greiner et al. | |
| 2010/0198466 | A1* | 8/2010 | Eklund | E02F 9/26 |
| | | | | 701/50 |
| 2011/0066310 | A1* | 3/2011 | Sakai | B60L 1/00 |
| | | | | 701/22 |
| 2012/0158279 | A1* | 6/2012 | Faivre | E02F 9/26 |
| | | | | 701/124 |
| 2014/0244098 | A1 | 8/2014 | Ueda et al. | |

FOREIGN PATENT DOCUMENTS

| | | |
|---|---|---|
| JP | 2009042244 A | 2/2009 |
| JP | 2010072766 A | 4/2010 |
| JP | 2013105278 A | 5/2013 |

OTHER PUBLICATIONS

Ivanic, "Data Collection and Development of New York City Refuse Truck Duty Cycle," SAE Technical Paper, 2007-01-4118, pp. 1-12, Oct. 29, 2007.
Office Action in corresponding Canadian Application No. 2892988, dated Aug. 8, 2016, 5 pages.
International Search Report dated Apr. 8, 2014 from International Application No. PCT/JP2014/056539, 2 pages.

\* cited by examiner

DRIVING ANALYZER AND DRIVING ANALYZING METHOD FOR HAULAGE VEHICLES

CROSS-REFERENCE TO RELATED APPLICATIONS

This application claims priority to International Application No. PCT/JP2014/056539 filed on Mar. 12, 2014, the contents of which are incorporated herein by reference in its entirety.

TECHNICAL FIELD

The present invention relates to a driving analyzer and a driving analyzing method for haulage vehicles.

BACKGROUND ART

In construction sites and mining sites, haulage vehicles such as dump trucks often repeatedly travel the same route. For instance, dump trucks used in mines repeatedly travel back and forth between a dump site where a load substance such as mineral ores is dumped from the dump trucks and a loading site where the dump trucks are loaded with the load substance.

A known management system specifies such a travel route for haulage vehicles, extracts fuel consumption information (i.e., information indicating fuel consumption for travel) from operation information of a plurality of haulage vehicles traveling the same specified route, and creates a fuel consumption index based on the extracted fuel consumption information (see, for instance, Patent Literature 1).

According to Patent Literature 1, when the plurality of dump trucks travel the specified route, an average fuel consumption of each of the dump trucks during travel is extracted to find a driver who drove the dump truck with an average fuel consumption of a predetermined threshold Ft or higher so that the driver is advised about driving based on a suggestion made for improvement of fuel consumption (see FIG. 24).

CITATION LIST

Patent Literature(s)

Patent Literature 1: JP-A-2013-105278

SUMMARY OF THE INVENTION

Problem(s) to be Solved by the Invention

According to Patent Literature 1, the average fuel consumption of each dump truck traveling the specified route is compared with a preset threshold to find a driver who drives with a high fuel consumption. However, the driving condition is not analyzed in detail, so that the suggestion for improvement merely include general contents and thus the fuel consumption is unlikely to be further improved.

An object of the invention is to provide a driving analyzer and a driving analyzing method for haulage vehicles such as dump trucks traveling the same route, capable of finding a driving operation enabling reduction of fuel consumption by analysis.

Means for Solving the Problem(s)

According to a first aspect of the invention, a driving analyzer for a haulage vehicle configured to repeatedly travel a same route, the driving analyzer includes: a data loader configured to acquire a cycle data set each time when the haulage vehicle travels the route back and forth and store the cycle data set in a memory, the cycle data set being acquired for a plurality of times to be stored in a form of a plurality of cycle data sets, the cycle data set including: position information of the traveling haulage vehicle; and driving information including information about a fuel consumption per cycle and a carried load amount per cycle; a data extractor configured to extract a reference cycle data set and an analysis-target cycle data set from the plurality of cycle data sets stored in the memory; a section extractor configured to divide the route into a plurality of sections based on the position information and extract an analysis-target section from the plurality of sections; and a driving information output unit configured to output a part of the driving information regarding the analysis-target section according to each of the reference cycle data set and the analysis-target cycle data set.

In the above aspect, the data loader acquires the operation information of a haulage vehicle as a cycle data set each time when the haulage vehicle travels the route back and forth, and stores the cycle data set in the memory, the operation information including position information and driving information. The driving information includes at least information about a fuel consumption and a load amount.

The data extractor extracts a reference cycle data set and an analysis-target cycle data set from a plurality of cycle data sets stored in the memory. Specifically, the fuel consumption for each cycle (i.e., the amount of fuel consumed to travel the route back and forth) is divided by the amount of a load substance carried in the cycle, and then the data extractor compares the cycle data sets in terms of fuel consumption for carrying the same amount of the load substance and extracts one of the cycle data sets with the lowest fuel consumption (i.e., the cycle data set indicating the optimum fuel-saving driving) as the reference cycled data and another one of the cycle data sets with a high fuel consumption as the analysis-target cycle data set.

Further, the section extractor divides the route into a plurality of sections based on the position information and extracts an analysis-target section therefrom. The driving information output unit then outputs a part of the driving information regarding the analysis-target section according to each of the reference cycle data set and the analysis-target cycle data set.

The reference cycle data set and the analysis-target cycle data set are thus compared with each other in terms of the part of the driving information regarding the analysis-target section to analyze a difference in driving operation therebetween. Then, the driving operation according to the reference cycle data set, which enables an appropriate fuel-saving driving, can be informed of a manager of a mine site and/or a haulage vehicle driver for dissemination of the fuel-saving driving.

Further, the part of the driving information regarding the extracted analysis-target section is outputted. In other words, only the part of the driving information regarding a section causing a large difference in driving information may be outputted without the necessity of outputting the driving information of all the sections. Therefore, the part of the driving information to be analyzed can be narrowed, which results in an efficient analysis of the driving operation.

In the above aspect, it is preferable that the data extractor extracts as the reference cycle data one of the plurality of cycle data sets with a smallest value obtained by dividing the fuel consumption per cycle by the carried load amount per cycle.

When the cycle data set with the smallest value of fuel consumption/load amount is extracted as the reference cycle data set, the driving information according to the analysis-target cycle data set can be compared with the driving information related to the most efficient fuel-saving driving, and thus useful advice about the driving operation can be given.

In the above aspect, it is preferable that the driving analyzer further include an evaluation value calculator configured to calculate an evaluation value for fuel-saving driving on a basis of each of the plurality of sections divided from the route based on the position information, the evaluation value including a reference evaluation value calculated from the fuel consumption according to the reference cycle data set and an analysis-target evaluation value calculated from the fuel consumption according to the analysis-target cycle data set, in which the section extractor compares the reference evaluation value and the analysis-target evaluation value on the basis of each of the plurality of sections, and extracts one of the sections that satisfies an extraction condition as the analysis-target section.

The evaluation value calculator calculates an evaluation value per section for fuel-saving driving according to each of the reference cycle data set and the analysis-target cycle data set, the evaluation value being calculated from the fuel consumption per section. The section extractor compares the evaluation value according to the reference cycle data set and the evaluation value according to the analysis-target cycle data set per section, and extracts one of the sections that satisfies an extraction condition as the analysis-target section. In this manner, for instance, a section causing a large difference in evaluation value may be extracted as the analysis-target section. Since the outputted driving information related to such a section has a large difference, the driving operation can be efficiently analyzed.

In the above aspect of the invention, it is preferable that the evaluation value calculated by the evaluation value calculator be any one of: a fuel consumption per section; a value obtained by dividing the fuel consumption per section by the carried load amount per cycle; and a value obtained by dividing the fuel consumption per section by a sum of a weight of the haulage vehicle and the carried load amount.

When the evaluation value is the fuel consumption, the data acquired from the haulage vehicle can be directly used without the necessity of any calculating process. When the evaluation value is a value of fuel consumption/load amount, an evaluation can be made based on a fuel consumption per load amount (i.e., an energy consumption rate) and such an evaluation value is easy for a user of the haulage vehicle to understand. When the evaluation value is a value of fuel consumption/(vehicle weight+load amount=total weight), an evaluation can be made based on a fuel consumption per total weight (i.e., an energy consumption rate).

In the above aspect, it is preferable that the section extractor extracts one of the sections that has a slope divided from the route as the analysis-target section.

As compared with a flat road, a slope causes a large difference in fuel consumption due to a difference in driving operation. Accordingly, a section having a slope is extracted as the analysis-target section of the route so that a difference in driving operation for the slope can be easily analyzed.

In the above aspect, it is preferable that the data extractor include a load-amount-based exclusion determining unit configured to exclude one of the cycle data sets not to be extracted, the carried load amount of the one of the cycle data sets being outside a predetermined range with reference to a maximum load amount of the haulage vehicle.

The load-amount-based exclusion determining unit excludes one of the cycle data sets with a load amount outside the predetermined range not to be extracted, thereby preventing extraction of data obtained under an unusual condition such as a cycle data set with a considerably small load amount. As a result, the cycle data sets with substantially the same load amount can be outputted to appropriately analyze a difference in driving operation.

In the above aspect, it is preferable that the driving information further include a travel time per cycle spent to travel the route back and forth, and the data extractor include a travel-time-based exclusion determining unit configured to exclude one of the cycle data sets not to be extracted, the travel time of the one of the cycle data sets being outside a predetermined range with reference to an average travel time.

The travel-time-based exclusion determining unit excludes one of the cycle data sets with a travel time outside the predetermined range not to be extracted, thereby preventing extraction of data obtained under an unusual condition such as a cycle data set with a considerably long travel time due to a traffic jam resulting from, for instance, a malfunction of any other haulage vehicle. As a result, the cycle data sets with substantially the same travel time can be outputted to appropriately analyze a difference in driving operation.

In the above aspect, it is preferable that the driving information further include a mileage per cycle accumulated to travel the route back and forth, and the data extractor include a mileage-based-exclusion determining unit configured to exclude one of the cycle data sets not to be extracted, the mileage of the one of the cycle data sets being outside a predetermined range with reference to an average mileage.

The mileage-based-exclusion determining unit excludes one of the cycle data sets with a mileage outside the predetermined range, thereby preventing extraction of data obtained under an unusual condition such as a cycle data set with a considerably long mileage due to making a detour from the route. As a result, the cycle data sets with substantially the same mileage can be outputted to appropriately analyze a difference in driving operation.

According to a second aspect of the invention, a driving analyzing method for a haulage vehicle configured to repeatedly travel a same route, the driving analyzing method includes: acquiring a cycle data set each time when the haulage vehicle travels the route back and forth; storing the cycle data set in a memory, the cycle data set being acquired for a plurality of times to be stored in a form of a plurality of cycle data sets, the cycle data set including: position information of the traveling haulage vehicle; and driving information including information about a fuel consumption per cycle and a carried load amount per cycle; extracting a reference cycle data set and an analysis-target cycle data set from the plurality of cycle data sets stored in the memory; dividing the route into a plurality of sections based on the position information; extracting an analysis-target section from the plurality of sections; and outputting a part of the driving information regarding the analysis-target section according to each of the reference cycle data set and the analysis-target cycle data set.

The above method of the second aspect of the invention can provide effects similar to those of the driving analyzer for the haulage vehicle.

BRIEF DESCRIPTION OF DRAWING(S)

DESCRIPTION OF EMBODIMENT(S)

Exemplary embodiment(s) of the invention will be described below with reference to the attached drawings.

Figure 1:
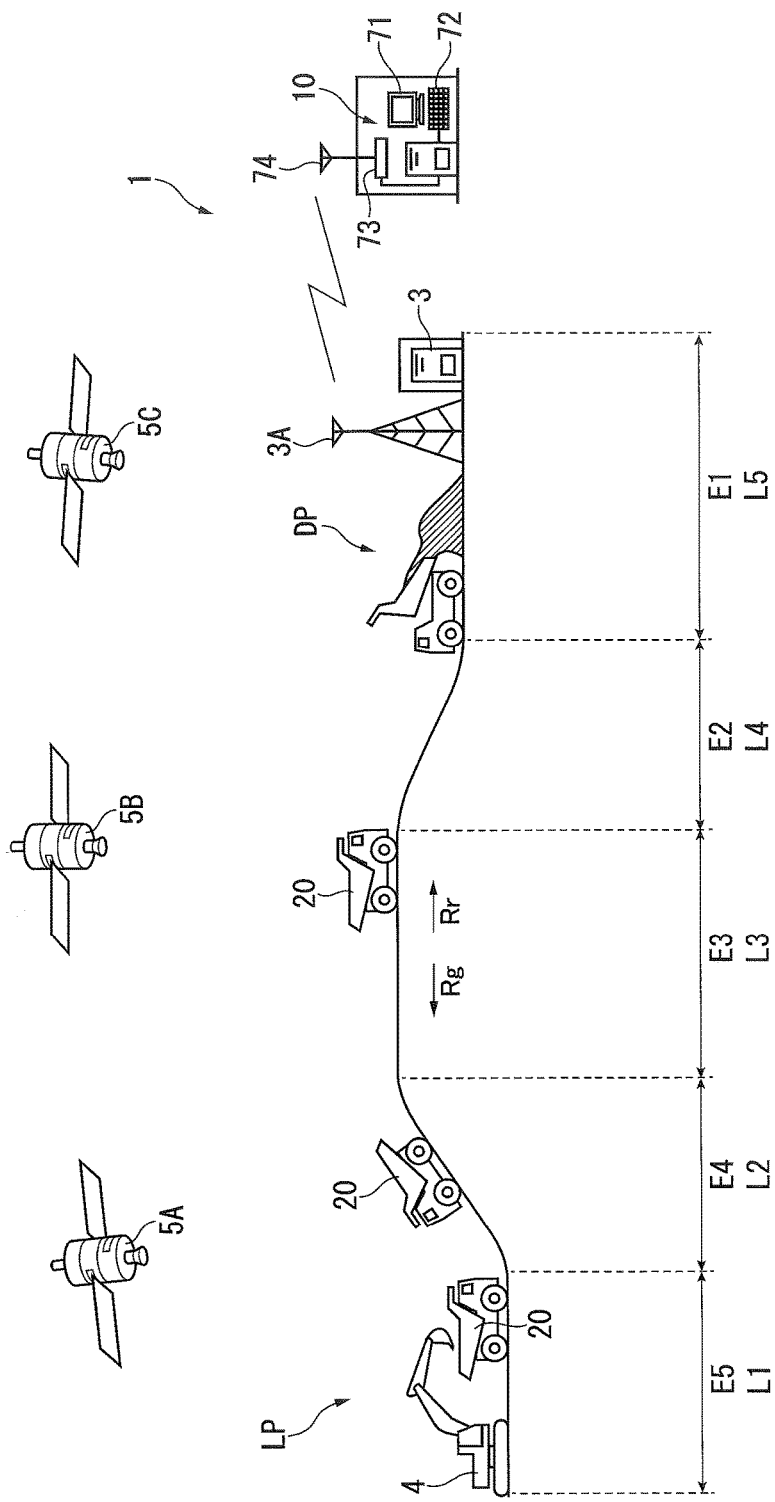
FIG. 1 shows a management system for a haulage vehicle according to an exemplary embodiment of the invention.

FIG. 1 shows a management system 1 for a haulage vehicle according to an exemplary embodiment of the invention, the management system 1 including a driving analyzer 10. The management system 1, which is configured to manage a dump truck 20 (a haulage vehicle) used in a mine or the like, includes: a wireless communication equipment 3 that collects operation information of the dump truck 20 through wireless communication in the mine; and the driving analyzer 10 capable of communicating with the wireless communication equipment 3.

Examples of a substance (a load substance) to be carried by the dump truck 20 include crushed stone, soil, sand, rock and coal, but may include any other substance.

The dump truck 20 travels between a site (hereinafter, referred to as a dump site) DP for dumping a load substance and a site (hereinafter, referred to as a loading site) LP for loading a substance with a loader 4. In the exemplary embodiment, the dump truck 20 without any load substance (in an empty state) travels from the dump site DP to the loading site LP so that the dump truck 20 is loaded with a load substance at the loading site LP, and then the dump truck 20 with the load substance (in a loaded state) travels to the dump site DP to dump the load substance there.

Accordingly, a route R for the dump truck 20 is determined, the route R including an outgoing route Rg for the dump truck 20 to travel from the dump site DP to the loading site LP and a return route Rr for the dump truck 20 to travel from the loading site LP to the dump site DP. It should be noted that the outgoing route Rg and the return route Rr may be the same or different as long as the outgoing route Rg and the return route Rr define the same route R.

The route R includes the dump site DP and the loading site LP, which are defined as the start and end of the route R, respectively. The dump truck 20 travels the same route R back and forth.

Schematic Arrangement of Management System for Haulage Vehicle

In the management system 1 for the dump truck 20 (the haulage vehicle), the driving analyzer 10 collects the operation information of the dump truck 20, from which mainly data for analyzing whether or not a fuel-saving driving is performed is extracted to be outputted. The outputted data may be analyzed by a person in charge of analysis to advise a driver of the dump truck 20 about the driving operation.

Accordingly, in the mine, the wireless communication equipment 3 that wirelessly communicates with the dump truck 20 is provided. The wireless communication equipment 3 includes an antenna 3A and communicates with the dump truck 20 through a wireless LAN (Local Area Network) or the like. An area where the wireless communication equipment 3 can communicate with the dump truck 20 via the antenna 3A usually fails to cover the entire route R. Therefore, a communication process between the dump truck 20 and wireless communication equipment 3 is performed only when the dump truck 20 is in the communication-available range where the wireless communication equipment 3 can communicate with the dump truck 20. For instance, the communication process may be performed with the dump truck 20 when the dump truck 20 is being refueled at a gas station built in the communication-available range.

The wireless communication equipment 3 outputs data received from the dump truck 20 to the driving analyzer 10. It should be noted that the driving analyzer 10 may be located in a management office in the mine, somewhere in the country having the mine, or in a foreign country.

Specifically, when the driving analyzer 10 is located in the management office in the mine, the wireless communication equipment 3 and the driving analyzer 10 may be connected through a network cable. When the driving analyzer 10 is located somewhere in the country (e.g., a company in charge of managing the mine or the dump truck 20) or in a management office in a foreign country, the wireless communication equipment 3 and the driving analyzer 10 may be connected through a mobile phone network or a satellite network so that the wireless communication equipment 3 and the driving analyzer 10 can communicate with each other.

Dump Truck

Figure 2:
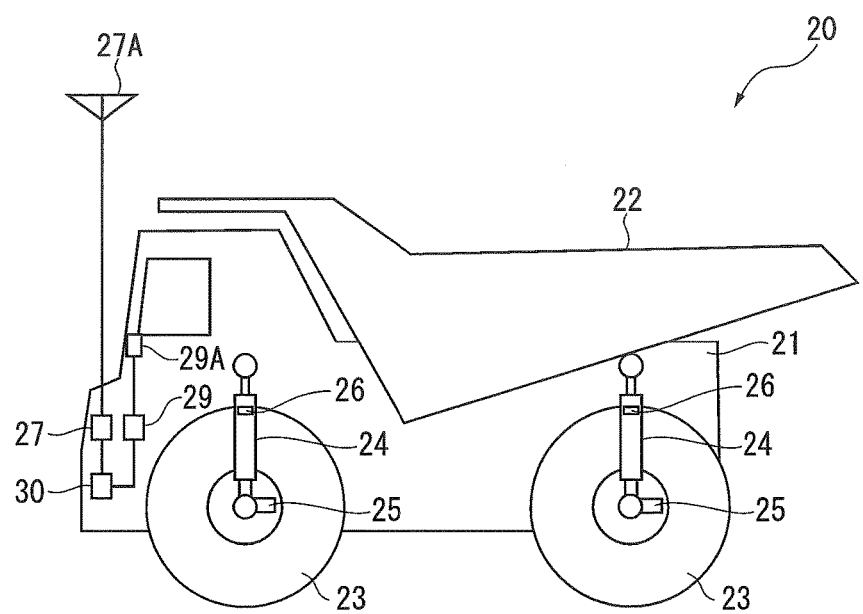
FIG. 2 shows an arrangement of a dump truck as the haulage vehicle.

FIG. 2 shows an arrangement of the dump truck. The dump truck 20 travels with a load substance and dumps the load substance at a desired site. The dump truck 20 includes a vehicle body 21, a vessel 22, wheels 23, a suspension cylinder 24, a rotation sensor 25, a suspension pressure sensor (a pressure sensor) 26, an in-vehicle wireless communication device 27 connected to a wireless communication antenna 27A, a position information detector 29 (a GPS receiver in the exemplary embodiment) connected to a GPS antenna 29A, and an in-vehicle information collector 30. It should be noted that the dump truck 20 is also provided with a variety of mechanisms and functions of a typical haulage vehicle in addition to the above elements. In the exemplary embodiment, the invention is applied to a rigid-frame dump truck (i.e., the dump truck 20) steered with front wheels (i.e., the wheels 23), but the invention is also applicable to an articulated dump truck including a vehicle body divided into front part and rear part articulated with flexibility.

In the dump truck 20, a motor is driven with electric power to drive the wheels 23, the electric power being generated by a generator driven by an internal combustion engine such as a diesel engine. The dump truck 20 is thus electrically driven but may be mechanically driven.

The vessel 22 functions as a truck box and disposed on an upside of the vehicle body 21. In the vessel 22, substances such as quarried crushed stone, rock, soil and coal are loaded with the loader 4 such as a hydraulic excavator. The wheels 23, each of which includes a tire and a wheel body, are attached to the vehicle body 21 and driven with a power transmitted from the vehicle body 21 as described above. The suspension cylinder 24 is disposed between each of the wheels 23 and the vehicle body 21. A load corresponding to the weights of the vehicle body 21, the vessel 22 and the load substance loaded in the vessel 22 acts on each of the wheels 23 via the suspension cylinder 24.

The rotation sensor 25 detects the rotation speed of the wheels 23 to measure a vehicle speed. The suspension cylinder 24, in which a hydraulic fluid is sealed, extends and contracts in response to the weight of the load substance. It should be noted that the suspension pressure sensor (also referred to as pressure sensor, if needed) 26 detects a load on the suspension cylinder 24. The pressure sensor 26 is provided to the suspension cylinder 24 of the dump truck 20 and the pressure of the hydraulic fluid in the pressure sensor 26 is detected to measure the weight of the load substance (a load amount).

The GPS antenna 29A receives an electric wave outputted from a plurality of GPS satellites 5A, 5B, 5C of a GPS (Global Positioning System) (see FIG. 1). The GPS antenna 29A outputs the received electric wave to the position information detector 29. The position information detector 29 converts the electric wave received by the GPS antenna 29A into an electric signal to calculate position information 291 of the position information detector 29 (i.e., the dump truck 20) (position measurement). In other words, the position information 291 includes the latitude, longitude and altitude of the dump truck 20.

The in-vehicle wireless communication device 27 wirelessly communicates with the wireless communication equipment 3 through the wireless communication antenna 27A and the antenna 3A as shown in FIG. 1. The in-vehicle wireless communication device 27 is connected to the in-vehicle information collector 30. With this arrangement, the in-vehicle information collector 30 sends and receives various information through the wireless communication antenna 27A. Next, description will be made on the in-vehicle information collector 30 and peripherals thereof.

In-Vehicle Information Collector and Peripherals Thereof

Figure 3:
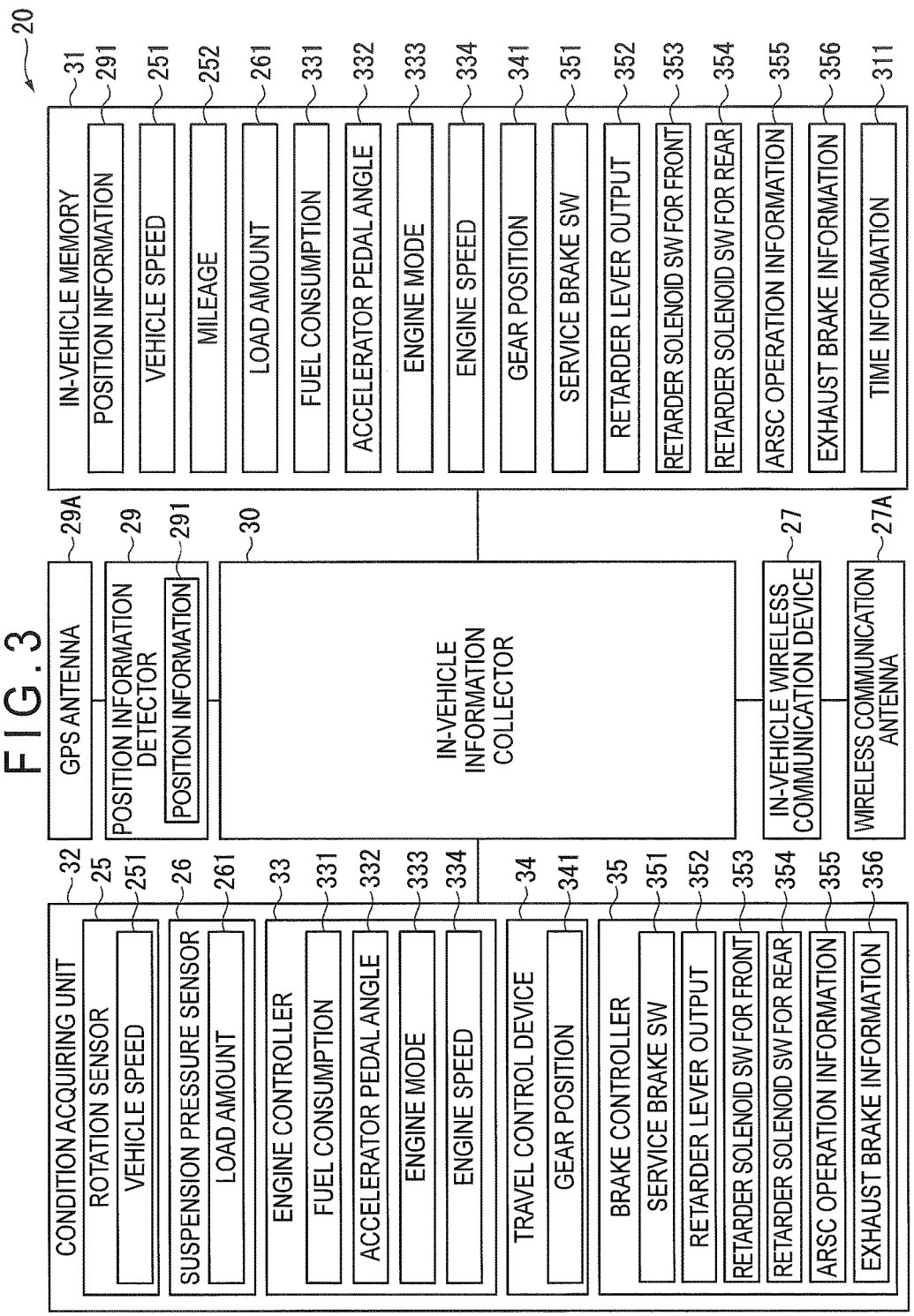
FIG. 3 is a functional block diagram showing the arrangement of the dump truck.

FIG. 3 is a functional block diagram showing the in-vehicle information collector and peripherals thereof. The in-vehicle information collector 30 of the dump truck 20 is connected to an in-vehicle memory 31, the in-vehicle wireless communication device 27 and the position information detector 29. Further, the in-vehicle information collector 30 is connected to a condition acquiring unit 32. The in-vehicle information collector 30 is, for instance, a computer (a vehicle controller) including a combination of a CPU (Central Processing Unit) and a memory.

The condition acquiring unit 32 is a device for acquiring various information about the operation state of the dump truck 20. The condition acquiring unit 32 includes, for instance, an engine controller 33, a travel controller 34 and a brake controller 35 in addition to a variety of sensors including the rotation sensor 25 and the suspension pressure sensor 26. The in-vehicle information collector 30 acquires various information about the operation state of the dump truck 20 from the condition acquiring unit 32, and stores the acquired information as the operation information in the in-vehicle memory 31.

Information Acquired from Rotation Sensor

The in-vehicle information collector 30 detects the rotation speed of the wheels 23 outputted from a rotation sensor 25 to acquire information on a vehicle speed 251.

Information Acquired from Suspension Pressure Sensor

The in-vehicle information collector 30 acquires a pressure applied to the hydraulic oil in the suspension cylinder 24 and detected by the suspension pressure sensor 26 to acquire a load amount 261 of the load substance in the vessel 22. The pressure sensor 26 is provided to each of the wheels 23 of the dump truck 20 (e.g., four pressure sensors 26 in the case of four wheels 23), and measurement values provided by these pressure sensors 26 are summed to obtain the weight of the load substance (the load amount). The pressure applied to the hydraulic fluid in each of the suspension cylinders 24 detected by each of the pressure sensors 26 indicates whether the vessel 22 of the dump truck 20 is loaded with a load substance (i.e., the loaded state) or the load substance is dumped from the vessel 22 (i.e., the empty state).

Information Acquired from Engine Controller

The in-vehicle information collector 30 acquires a control amount of a fuel injector from the engine controller 33 to acquire information on a fuel consumption 331.

The in-vehicle information collector 30 acquires information on an accelerator pedal angle 332 (i.e., an operation amount of an accelerator) via the engine controller 33.

The in-vehicle information collector 30 acquires information on an engine mode 333 from the engine controller 33. The engine mode includes a power mode for exhibiting a high work efficiency and an economy mode for restraining fuel consumption, which are switchable by a switch operation or the like.

The in-vehicle information collector 30 acquires information on an engine speed 334 from the engine controller 33. The engine speed 334 is detectable by a rotation sensor or the like attached to an engine output shaft.

It should be noted that the in-vehicle information collector 30 may also acquire various information for engine control (e.g., a cooling water temperature and a lubricating oil pressure) from the engine controller 33.

Information Acquired from Travel Controller

The in-vehicle information collector 30 acquires information on a gear position 341 of a transmission from the travel controller 34.

Information Acquired from Brake Controller

The in-vehicle information collector 30 acquires information on the states of brakes from the brake controller 35.

The in-vehicle information collector 30 acquires the status of a service brake switch 351 (e.g., "0" or "1") to acquire information on whether or not a service brake (a footbrake) is operated.

The in-vehicle information collector 30 acquires a numerical value (%) of a retarder lever output 352 to acquire information on the operation amount of the retarder lever operated by the driver.

The in-vehicle information collector 30 acquires the status of a front-wheel retarder solenoid switch 353 and the status of a rear-wheel retarder solenoid switch 354 to acquire information on the respective operation states of the front and rear wheels.

The in-vehicle information collector 30 acquires an ARSC (Automatic Retard Speed Control) operation information 355. ARSC is a function for setting a downhill vehicle speed as desired and the ARSC operation information 355 indicates whether ARSC is on or off.

The in-vehicle information collector 30 acquires exhaust brake information 356 on whether or not an exhaust brake is in operation.

It should be noted that the in-vehicle information collector 30 may acquire a driver ID for identifying the driver of the dump truck 20 and/or information from an inclination sensor for detecting an inclination of the dump truck 20. The in-vehicle information collector 30 may further acquire information on the lifted/lowered state of the vessel 22.

In-Vehicle Memory

The in-vehicle memory 31 includes, for instance, one of a RAM (Random Access Memory), a ROM (Read Only Memory), a flash memory and a hard disc drive or a combination thereof. The in-vehicle memory 31 stores, for instance, a computer program with a command for the in-vehicle information collector 30 to collect the operation information, and various setting values for the operation of the management system 1.

The in-vehicle information collector 30: reads the computer program; acquires the operation information from the condition acquiring unit at a predetermined timing; and stores the acquired operation information in the in-vehicle memory 31. Specifically, the in-vehicle information collector 30 stores the operation information obtained during the back and forth travel of the dump truck 20 along the outgoing route Rg from the dump site DP (the start of the route) to the loading site LP and along the return route Rr from the loading site LP to the dump site DP (the end of the route) as a cycle data set.

The in-vehicle memory 31 stores the position information 291, time information 311 and driving information as the operation information. The driving information includes, for instance, the vehicle speed 251, a mileage 252 calculated from an engine speed cumulative value, the load amount 261, the fuel consumption 331, the accelerator pedal angle 332, the engine mode 333, the engine speed 334, the gear position 341, the service brake switch 351, the retarder lever output 352, the front-wheel retarder solenoid switch 353, the rear-wheel retarder solenoid switch 354, the ARSC operation information 355, and the exhaust brake information 356.

The above driving information is stored in the in-vehicle memory 31 along with the position information 291 acquired by the position information detector 29 and the time information 311 acquired by the in-vehicle information collector 30.

The above operation information stored in the in-vehicle memory 31 is merely an example and any other information may also be stored.

Upon reception of a command signal for sending the operation information from the driving analyzer 10 of the management system 1 or the wireless communication equipment 3, the in-vehicle information collector 30 sends the operation information stored in the in-vehicle memory 31 to the wireless communication equipment 3 through the in-vehicle wireless communication device 27. The wireless communication equipment 3 sends the received operation information to the driving analyzer 10.

Driving Analyzer

Figure 4:
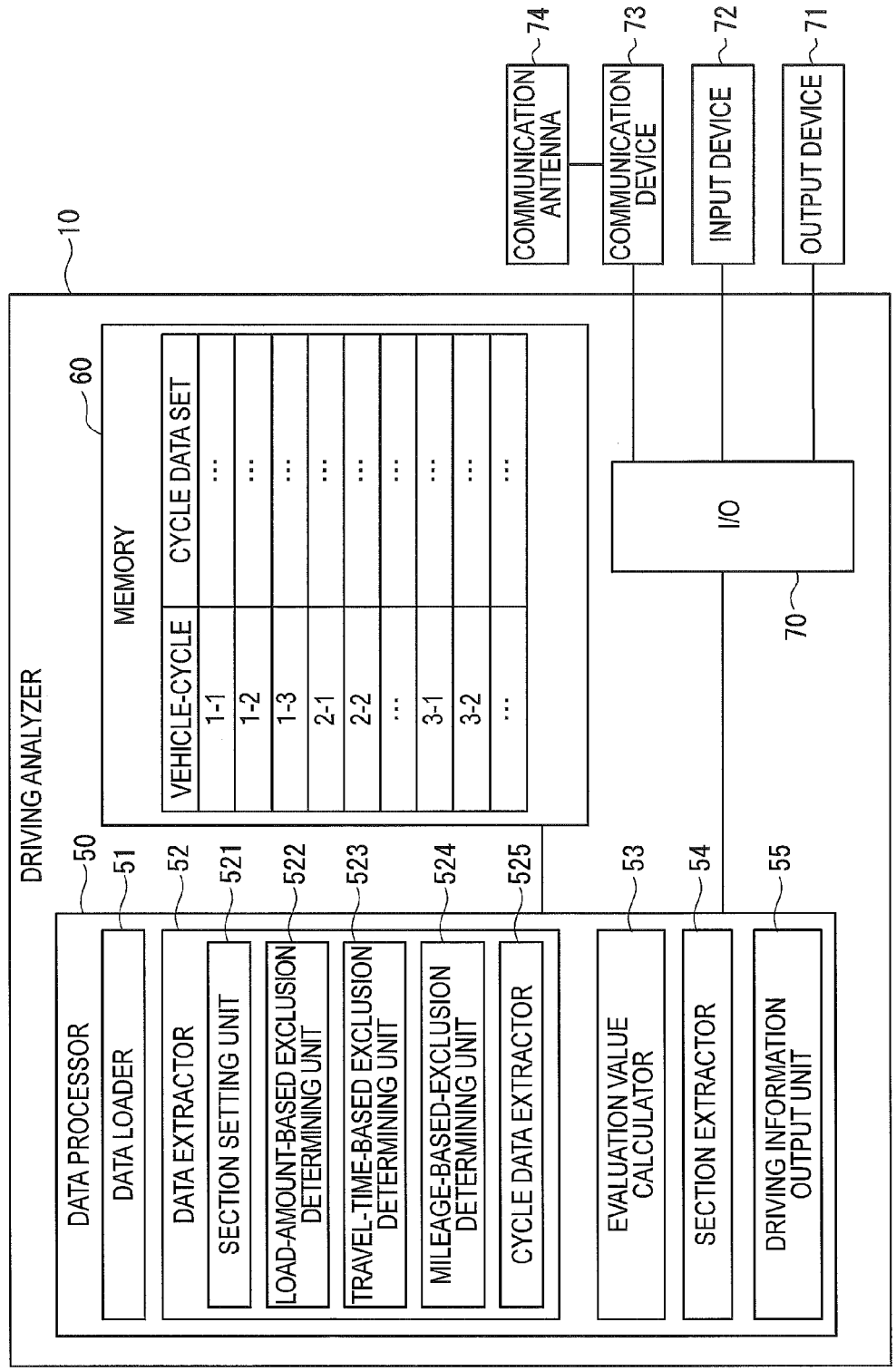
FIG. 4 is a functional block diagram showing an arrangement of a driving analyzer.

FIG. 4 is a functional block diagram of the driving analyzer 10. The driving analyzer 10, which may be a server located in, for instance, a company in charge of managing the operation of the dump truck 20, includes a data processor 50, a memory 60 and an I/O unit (I/O) 70. The I/O unit 70 is an interface for the input/output of information between the data processor 50 and an external device. The I/O unit 70 is connected to an output device 71 (e.g., a display and a printer), an input device 72 (e.g., a keyboard and a mouse) and a communication device 73. The communication device 73 is connected to a communication antenna 74. The driving analyzer 10 thus communicates with the wireless communication equipment 3 through the communication device 73.

The data processor 50 includes a CPU (Central Processing Unit). The memory 60 includes a RAM (Random Access Memory), a ROM (Read Only Memory), a flash memory, a hard disc drive or the like.

Data Processor

The data processor 50 includes a data loader 51, a data extractor 52, an evaluation value calculator 53, a section extractor 54 and a driving information output unit 55.

Data Loader

The data loader 51 loads the operation information (the various information stored in the in-vehicle memory 31) as the cycle data set per traveling the route R in the memory 60, the operation information being sent from the dump truck 20 and received by the communication device 73 through the wireless communication equipment 3.

Specifically, the operation information includes the position information 291 stored in the in-vehicle memory 31, the time information 311 and the driving information. The driving information thus includes, for instance, the vehicle speed 251, the mileage 252, the load amount 261, the fuel consumption 331, the accelerator pedal angle 332, the engine mode 333, the engine speed 334, the gear position 341, the service brake switch 351, the retarder lever output 352, the retarder solenoid switch 353, the retarder solenoid switch 354, the ARSC operation information 355 and the exhaust brake information 356.

When a plurality of dump trucks 20 are in operation, the memory 60 stores two or more cycle data sets of each of the dump trucks 20. For instance, when the plurality of dump trucks 20 each travel the route R back and forth two or more times, two or more cycle data sets of each of the dump trucks 20 are stored. Specifically, the cycle data sets are each associated with a vehicle number for identifying the dump truck 20 and the number of cycles.

It should be noted that a cycle data set(s) during a predetermined period of time is stored in the memory 60. For instance, when a cycle data set(s) obtained in one week is stored, analysis is performed on the obtained cycle data set(s).

Data Extractor

The data extractor 52 includes a section setting unit 521, a load-amount-based exclusion determining unit 522, a travel-time-based exclusion determining unit 523, a mileage-based exclusion determining unit 524 and a cycle data extractor 525.

The section setting unit 521 divides the route R into a plurality of sections based on the position information stored in the memory 60. For instance, when it is found that a flat ground leads to a slope based on altitudes indicated in the position information, the route R is divided into a flat ground section and a slope section. Similarly, when it is found that a linear road is curved and thus a traveling direction is changed by a predetermined angle or more based on latitude and longitude information, the route R is divided into sections defined before and after the curve. The route R (the outgoing route Rg and the return route Rr) is in this manner divided into a plurality of sections. It should be noted that the route R may be divided not only based on the position information but also based on the driving information (e.g., handling) or the like.

As shown in FIG. 1, the outgoing route Rg is divided into five sections E1 to E5 and the return route Rr is divided into five sections L1 to L5. According to the example of FIG. 1, the outgoing route Rg and the return route Rr are the same, so that E1 to E5 respectively inversely correspond to L1 to L5. However, since the traveling direction of the dump truck 20 on the outgoing route Rg is opposite to that on the return route Rr, E2 is an uphill section and E4 is a downhill section, whereas L2 is an uphill section and L4 is a downhill section.

It should be noted in the exemplary embodiment, the section setting unit 521 automatically divides the route R into the plurality of sections, but a person in charge of analyzing the driving information of the dump truck 20 with the driving analyzer 10 may be manually set the sections.

Exclusion Determining Unit

The data extractor 52 includes three exclusion determining units including the load-amount-based exclusion determining unit 522, the travel-time-based exclusion determining unit 523 and the mileage-based exclusion determining unit 524 to exclude specific data from the plurality of cycle data sets stored in the memory 60.

The load-amount-based exclusion determining unit 522 determines whether or not the load amount of each of the cycle data sets falls within a predetermined range with reference to a rated load amount of the dump truck 20 (e.g., 90 to 110% of the rated load amount), and excludes one(s) of the cycle data sets with a load amount outside the predetermined range.

The travel-time-based exclusion determining unit 523 determines whether or not the travel time spent to travel the route R of each of the cycle data sets falls within a predetermined range with reference to an average travel time of the cycle data set (e.g., 90 to 110% of the average travel time), and excludes one(s) of the cycle data sets with a travel time outside the predetermined range.

The mileage-based exclusion determining unit 524 determines whether or not the mileage along the route R of each of the cycle data sets falls within a predetermined range with reference to an average mileage of the cycle data set (e.g., 90 to 110% of the average travel mileage), and excludes one(s) of the cycle data sets with a mileage outside the predetermined range.

Cycle-Data Extractor

The cycle data extractor 525 extracts a reference cycle data set and an analysis-target cycle data set from the cycle data sets not excluded by the exclusion determining units 522, 523, 524 based on a value of fuel consumption/load amount per cycle [L/ton].

Specifically, the cycle data extractor 525 selects one of the cycle data sets with the smallest value of fuel consumption/ load amount per cycle [L/ton] as the reference cycle data set.

It should be noted that any other information may also be considered to select the reference cycle data set. For instance, among from the cycle data sets with values less than a preset threshold, the cycle data set with the shortest travel time spent to travel the route R may be selected as the reference cycle data set. Alternatively, the reference cycle data set may be not the cycle data set with the smallest value of fuel consumption/load amount per cycle [L/ton] but the cycle data set with the second smallest value as long as the reference on-cycle data set serves as a reference for comparison of driving operation. The reference cycle data set may be selected not based on a value of fuel consumption/ load amount [L/ton], but based on a value of fuel consumption/total weight [L/ton] or merely based on a value of fuel consumption [L]. It should be noted that the total weight is the sum of the vehicle weight of the dump truck 20 (an emptied-vehicle weight) and the load amount.

The cycle data extractor 525 compares the cycle data sets with the reference cycle data set to select the analysis-target cycle data set (i.e., the target to be analyzed). For instance, the cycle data sets may be sequentially selected one by one as the analysis-target cycle data set by the cycle data extractor 525 in descending order from one of the cycle data sets with the largest value of fuel consumption/load amount per cycle [L/ton].

Evaluation Value Calculator

The evaluation value calculator 53 calculates an evaluation value for fuel-saving driving according to each of the reference cycle data set and the analysis-target cycle data set. Specifically, the evaluation value is calculated from a fuel consumption per section obtained from the part of the driving information regarding each of the plurality of sections of the route divided based on the position information.

In the exemplary embodiment, the evaluation value calculator 53 calculates a value of fuel consumption/vehicle weight [L/ton] per section as the evaluation value. The "vehicle weight" is the vehicle weight of the dump truck 20 in the empty state. Therefore, since the vehicle weight is a constant value, the evaluation value increases with an increase in the fuel consumption and decreases with a decrease in the fuel consumption.

Section Extractor

The section extractor 54 compares the evaluation value according to the reference cycle data set and the evaluation value according to the analysis-target cycle data set per section, and extracts one(s) of the sections where a comparison result satisfies a preset extraction condition as an analysis-target section(s).

Specifically, the section extractor 54 may calculate a difference per section between the evaluation value according to the reference cycle data set and the evaluation value according to the analysis-target cycle data set to extract one(s) of the sections with a difference equal to or more than a threshold, or, alternatively, may calculate a ratio per section of the evaluation value according to the analysis-target cycle data set to the evaluation value according to the reference cycle data set to extract one(s) of the sections with a ratio equal to or more than a threshold (e.g., 130%). In this manner, the section extractor 54 can automatically extract one(s) of the sections satisfying the extraction condition. In the case where the number of the sections that satisfy the extraction condition is equal to or larger than a predetermined number, the sections may be sequentially extracted in descending order of the difference or ratio until the predetermined number is reached.

Driving Information Output Unit

The driving information output unit 55 outputs a part of the driving information regarding the section(s) extracted by the section extractor 54. Any information necessary for the analysis of the driving state may be selected from the operation information stored in the memory 60 to be outputted as the driving information. For instance, the driving information may include the vehicle speed [km/h], the gear position, a GPS altitude [m], a fuel consumption cumulative value [L], an instantaneous fuel consumption [L/sec], the accelerator pedal angle [%], the engine speed [rpm] and brake operation information. It should be noted that when the GPS altitude corresponding to the mileage is outputted, it can be analyzed whether the section is a flat ground or an uphill/downhill slope.

Further, the driving information may be outputted from the driving information output unit 55 to a printer, display or the like as the output device 71 or, alternatively, may be outputted in the form of data to a predetermined management device or the like.

Driving Analyzing Process

Figure 5:
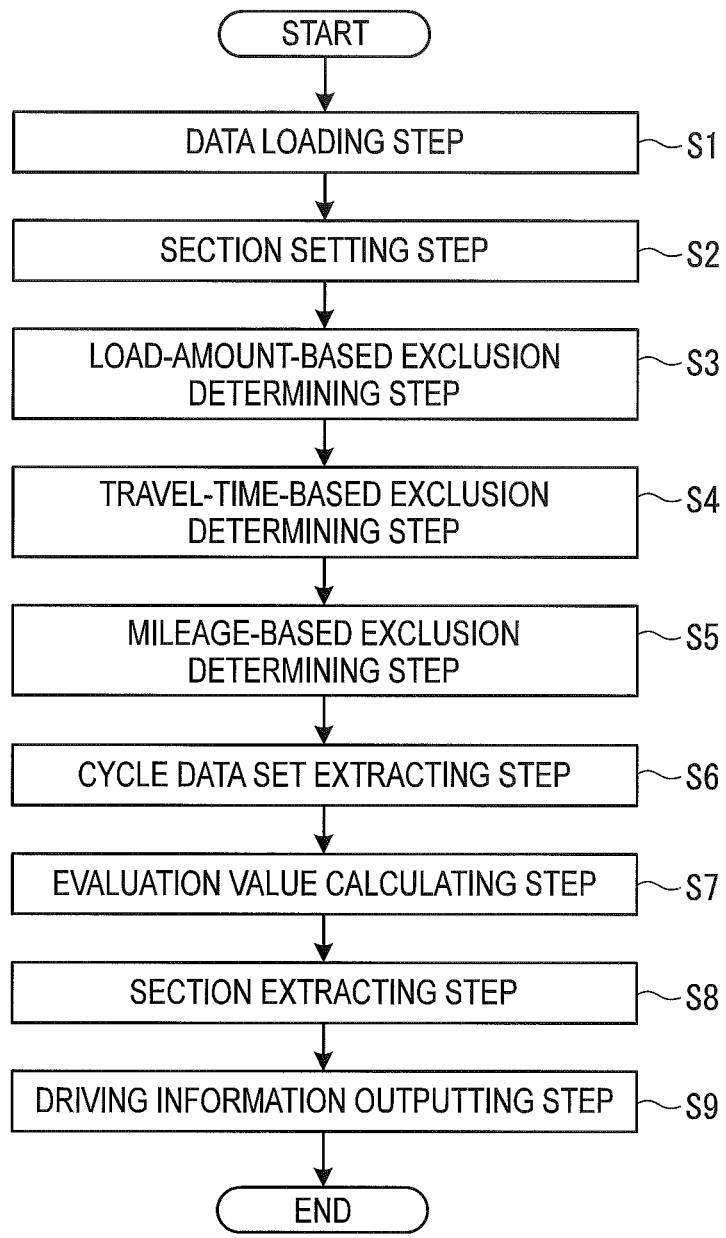
FIG. 5 is a flow chart showing a process according to a driving analyzing method.

Next, a driving analyzing process performed by the driving analyzer 10 will be described with reference to a flow chart of FIG. 5, graphs of FIGS. 6 and 7 and driving information reports of FIGS. 8 to 11.

First, the data loader 51 of the driving analyzer 10 performs a data loading step for acquiring the operation information of the dump truck 20 through the communication device 73 and storing the operation information in the memory 60 (step S1).

It should be noted that the operation information of the dump truck 20 has been usually temporarily been stored in the wireless communication equipment 3, so that the data loader 51 acquires the operation information from the wireless communication equipment 3. However, the data loader 51 may alternatively acquire the operation information directly from the dump truck 20 through the wireless communication equipment 3.

Next, the data extractor 52 performs a data extracting step (steps S2 to S6).

Specifically, the section setting unit 521 first performs a section setting step on each of the cycle data sets to divide the route R into the plurality of sections based on, for instance, the position information included in the operation information stored in the memory 60 (step S2). It should be noted that the section setting step S2 may be omitted when a person in charge of analysis manually define the sections.

Next, the load-amount-based exclusion determining unit 522 performs a load-amount-based exclusion determining step to exclude one(s) of the plurality of cycle data sets stored in the memory 60, the one(s) of the plurality of cycle data sets indicating a load amount outside the predetermined range with reference to a maximum load amount (step S3).

Next, the travel-time-based exclusion determining unit 523 performs a travel-time-based exclusion determining step to exclude one(s) of the rest of cycle data sets passing through step S3, the one(s) of the rest of cycle data sets indicating a travel time outside the predetermined range with reference to the average travel time (step S4).

Next, the mileage-based exclusion determining unit 524 performs a travel-time-based exclusion determining step to exclude one(s) of the rest of cycle data sets passing through step S4, the one(s) of the rest of cycle data sets indicating a mileage outside the predetermined range with reference to the average mileage (step S5).

As a result, in the exemplary embodiment, the cycle date sets with values determined to fall within the predetermined range by each of the exclusion determining units 522, 523, 524 are left as analysis targets.

Next, the cycle data extractor 525 performs a cycle data set extracting step to extract, from among the cycle data sets not excluded by the exclusion determining units 522, 523, 524, the reference cycle data set and the analysis-target cycle data set based on a value of fuel consumption/load amount per cycle [L/ton] (step S6).

Figure 6:
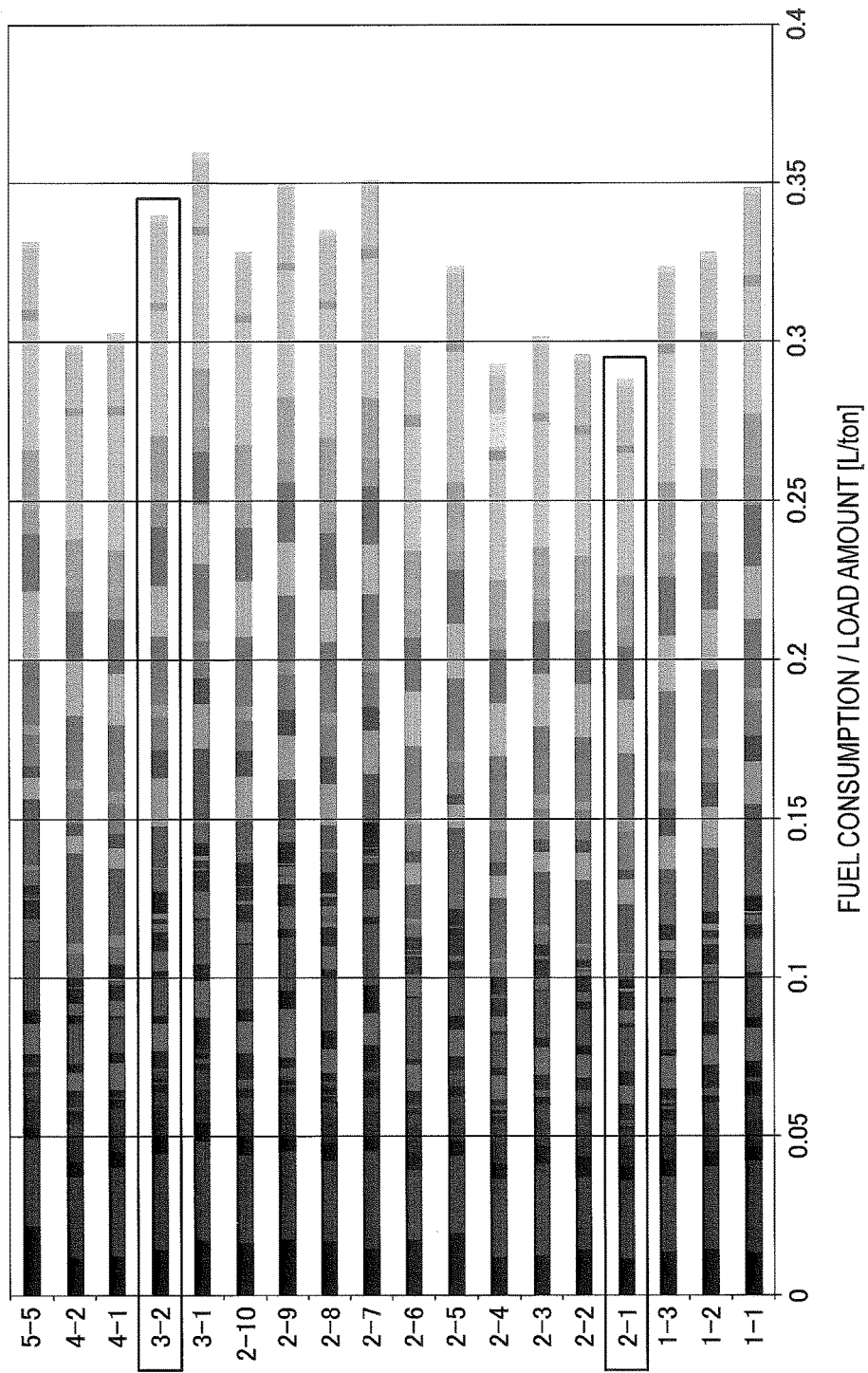
FIG. 6 is a graph showing values of fuel consumption amount/load amount according to cycle data sets.

FIG. 6 is a bar graph showing values of fuel consumption/load amount [L/ton] of the cycle data sets not excluded by the exclusion determining units 522, 523, 524. It should be noted that the graph of FIG. 6 is made by dividing the total amount of fuel consumed by the dump truck 20 to travel the route R back and forth by the amount of the load substance carried by the dump truck 20 traveling the route R back and forth. However, the graph may be made by cumulating a value of fuel consumption/load amount per section calculated by dividing the fuel consumption per section by the amount of the load substance carried by the dump truck 20 traveling the route R back and forth.

In the example of FIG. 6, the cycle data extractor 525 extracts a cycle data set 2-1 (i.e., data of a first cycle of the dump truck 20 numbered as 2) with the smallest value of fuel consumption/load amount per cycle [L/ton] as the reference cycle data set, and extracts a cycle data set 3-2 (i.e., data of a second cycle of the dump truck 20 numbered as 3) as the analysis-target cycle data set.

Next, the evaluation value calculator 53 performs an evaluation value calculating step on the reference cycle data set 2-1 and the analysis-target cycle data set 3-2 to calculate a value of fuel consumption/vehicle weight [L/ton] per section as an evaluation value (step S7). FIG. 7 is a bar graph showing the evaluation value (i.e., fuel consumption/vehicle weight) per section according to each of the reference cycle data set 2-1 and the analysis-target cycle data set 3-2.

Next, the section extractor 54 performs a section extracting step to compare the evaluation value according to the reference cycle data set and the evaluation value according to the analysis-target cycle data set per section and extract one(s) of the sections where a comparison result satisfies the extraction condition as the analysis-target section(s).

Figure 7:
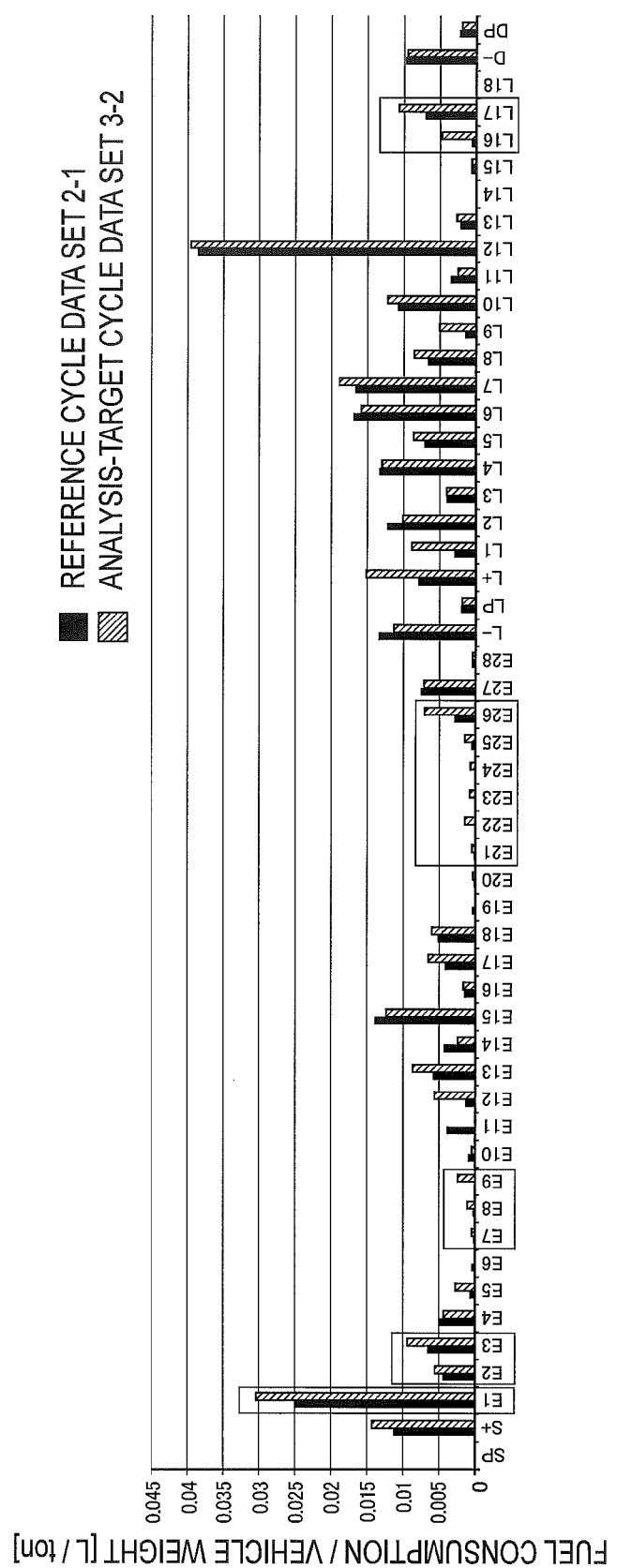
FIG. 7 is a graph showing an evaluation value according to each of a reference cycle data set and an analysis-target cycle data set per section.

In the example of FIG. 7, the section extractor 54 extracts section E1, sections E2 and E3, sections E7 to E9, sections E21 to E26, and sections L16 and L17.

Next, the driving information output unit 55 performs a driving information outputting step to output a part of the driving information regarding the sections extracted by the section extractor 54 to the output device 71 (e.g., a display and a printer) (step S9). FIGS. 8 to 12 respectively show reports of the driving information of the section E1, sections E2 and E3, sections E7 to E9, sections E21 to E26, and sections L16 and L17. It should be noted that the values according to the cycle data set 2-1 are shown by a dotted line and the values according to the analysis-target cycle data set 3-2 are shown by a solid line in FIGS. 8 to 12.

Figure 8:
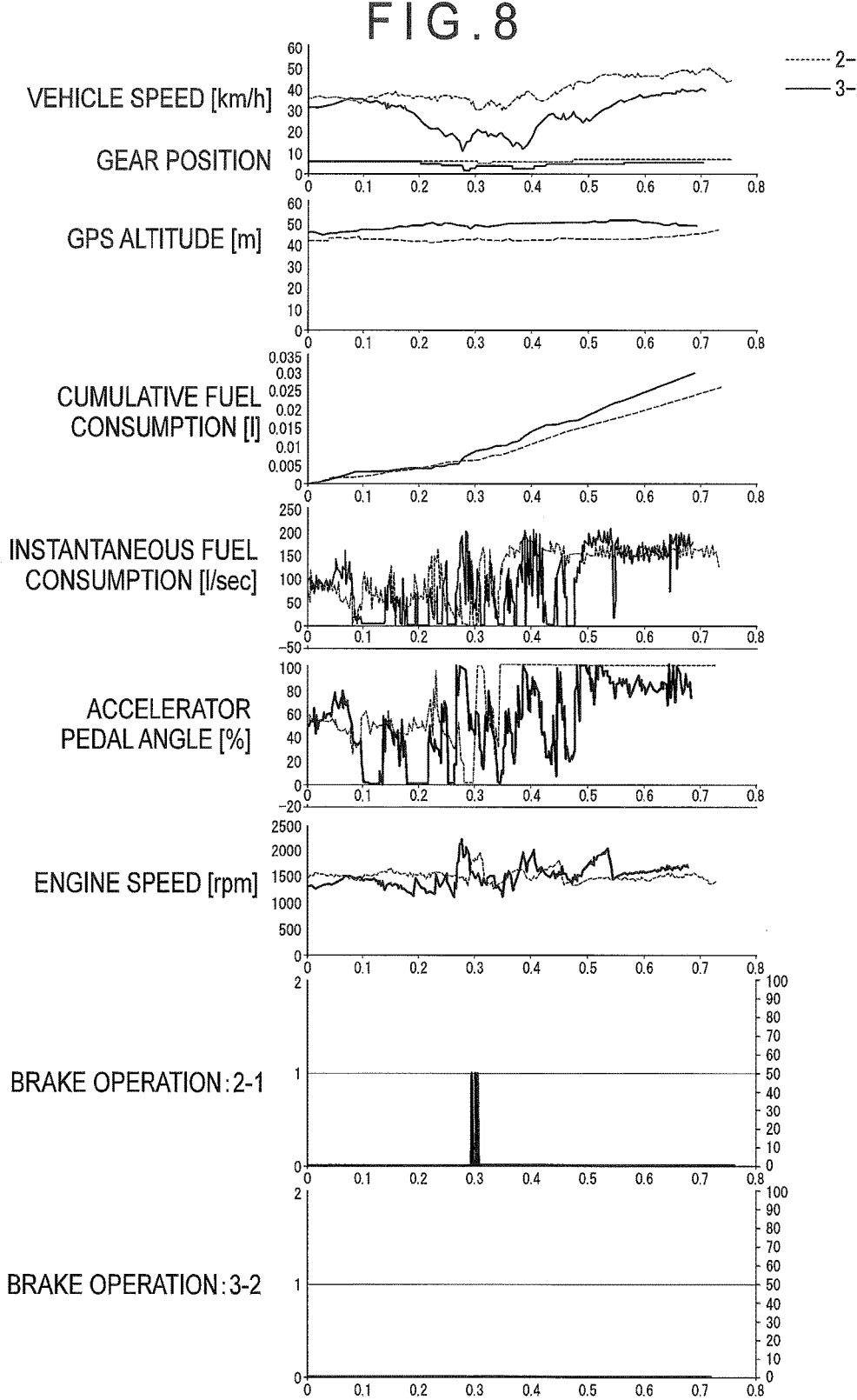
FIG. 8 shows a report indicating driving information of a section E1.

FIG. 8 shows the driving information of the dump truck 20 traveling in the section E1 (i.e., a flat road) in the empty state. In FIG. 8, according to an analysis, it can be found that as compared with the reference cycle data set 2-1, the analysis-target cycle data set 3-2 is large in fuel consumption cumulative value and thus is poor in fuel efficiency. According to a further analysis for investigating a cause of the above, since a variation in the accelerator pedal angle is large, it can be found that the driver frequently accelerates and decelerates the dump truck 20 by controlling the accelerator, so that the vehicle speed fluctuates and the transmission ratio is lowered, which results in an increased amount of fuel consumed to recover the vehicle speed.

Accordingly, based on the analysis of the report of the driving information of FIG. 8, a person in charge of analysis may advise the driver related to the analysis-target cycle data set 3-2 to drive the dump truck 20 at a constant vehicle speed in the section E1 to improve the fuel efficiency.

Figure 9:
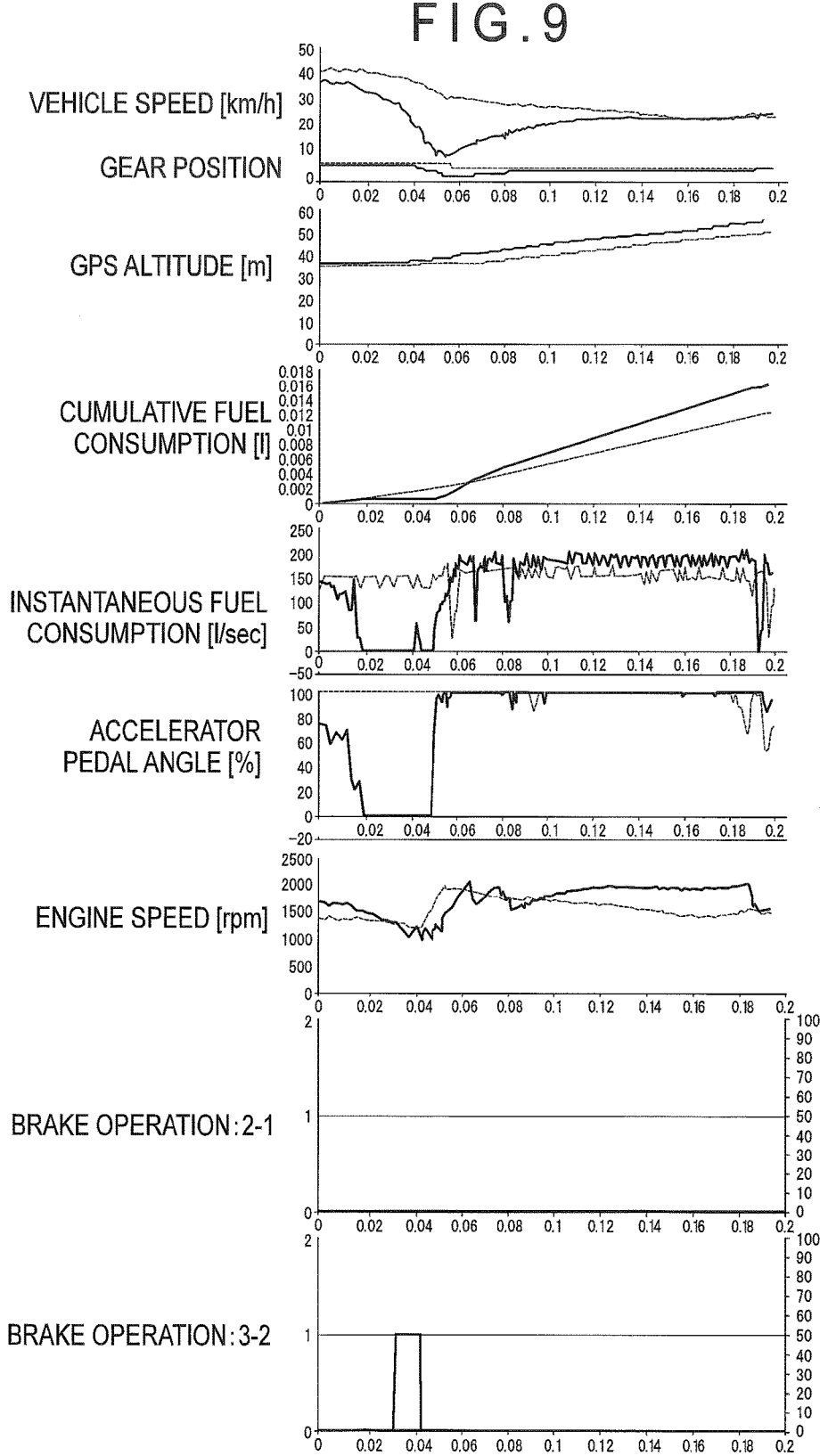
FIG. 9 shows a report indicating driving information of sections E2 and E3.

FIG. 9 shows the driving information of the dump truck 20 traveling from the flat section E2 to the uphill section E3 in the empty state. Similarly, in FIG. 9, the analysis-target cycle data set 3-2 is large in fuel consumption cumulative value as compared with the reference cycle data set 2-1. According to an analysis for investigating a cause of the above, it can be found that the service brake is pressed to reduce the vehicle speed when the dump truck 20 starts traveling up an uphill slope and thus the fuel is consumed to recover the vehicle speed.

Accordingly, based on the analysis of the report of the driving information of FIG. 9, the person in charge of analysis may advise the driver related to the analysis-target cycle data set 3-2 to adjust the vehicle speed for entering the uphill slope to a corresponding section initial vehicle speed according to the reference cycle data set 2-1 to improve the fuel efficiency.

Figure 10:
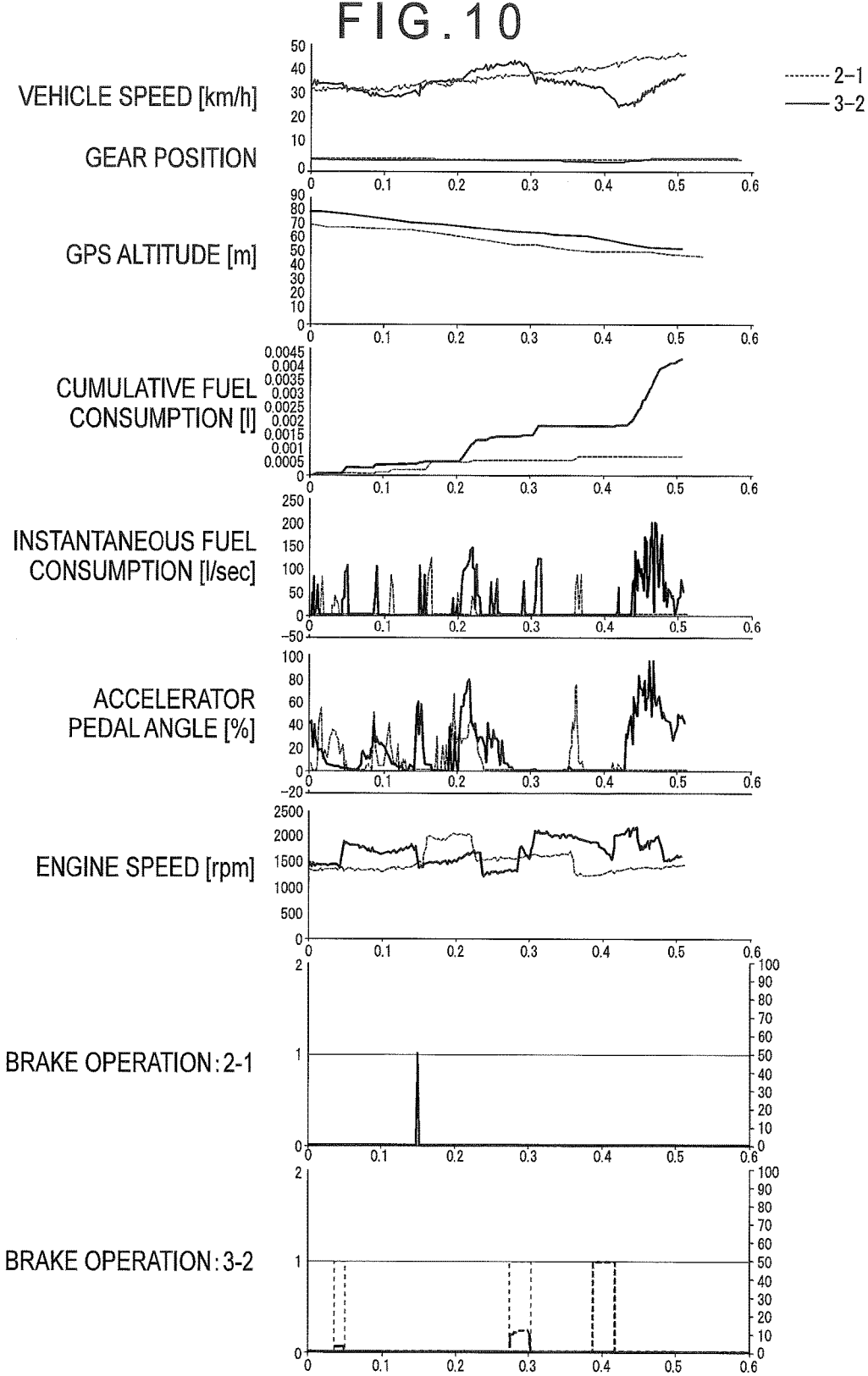
FIG. 10 shows a report indicating driving information of sections E7 to E9.

FIG. 10 shows the driving information of the dump truck 20 traveling from the downhill section E7 to the downhill section E9 in the empty state. Similarly, in FIG. 10, the analysis-target cycle data set 3-2 is large in fuel consumption cumulative value as compared with the reference cycle data set 2-1. According to an analysis for investigating a cause of the above, it can be found that the brake and the accelerator are alternately pressed and thus the fuel is consumed.

Accordingly, based on the analysis of the report of the driving information of FIG. 10, the person in charge of analysis may advise the driver related to the analysis-target cycle data set 3-2 to use an auto retarder and set the vehicle speed at a corresponding average vehicle speed according to the reference cycle data set 2-1 to improve the fuel efficiency.

Figure 11:
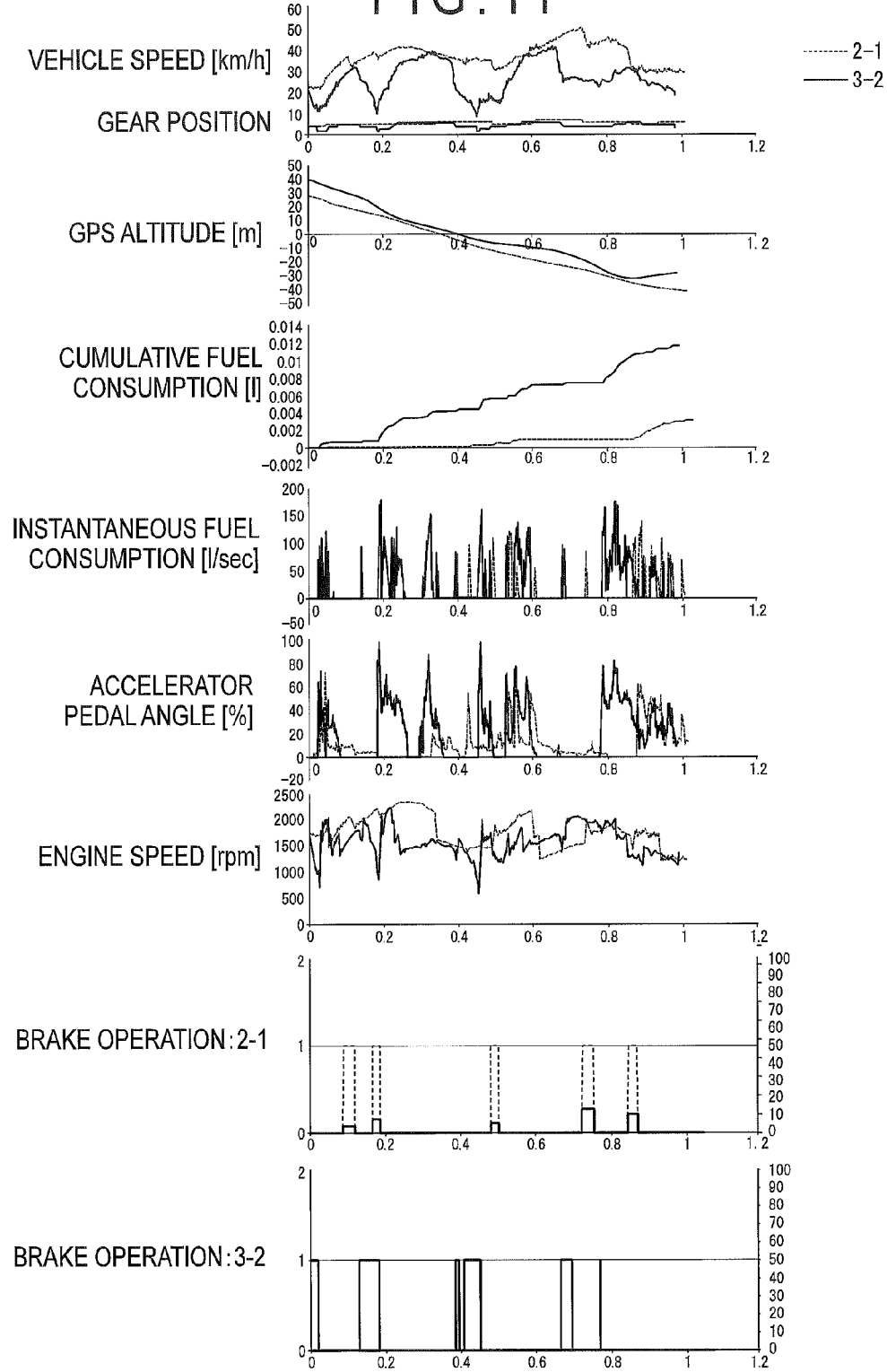
FIG. 11 shows a report indicating driving information of sections E21 to E26.

FIG. 11 shows the driving information of the dump truck 20 traveling from the downhill sections E21 to E26 in the empty state. Similarly, in FIG. 11, the analysis-target cycle data set 3-2 is large in fuel consumption cumulative value as compared with the reference cycle data set 2-1. According to an analysis for investigating a cause of the above, it can be found that the service brake (footbrake) is frequently pressed during travelling down a downhill slope, which results in unstable vehicle speed and gear position, and the fuel is consumed by alternately pressing the brake and the accelerator.

Accordingly, based on the analysis of the report of the driving information of FIG. 11, the person in charge of analysis may advise the driver related to the analysis-target cycle data set 3-2 to use the auto retarder and/or operate a retarder lever to adjust the vehicle speed in the case of the necessity of manually adjusting the vehicle speed to improve the fuel efficiency.

Figure 12:
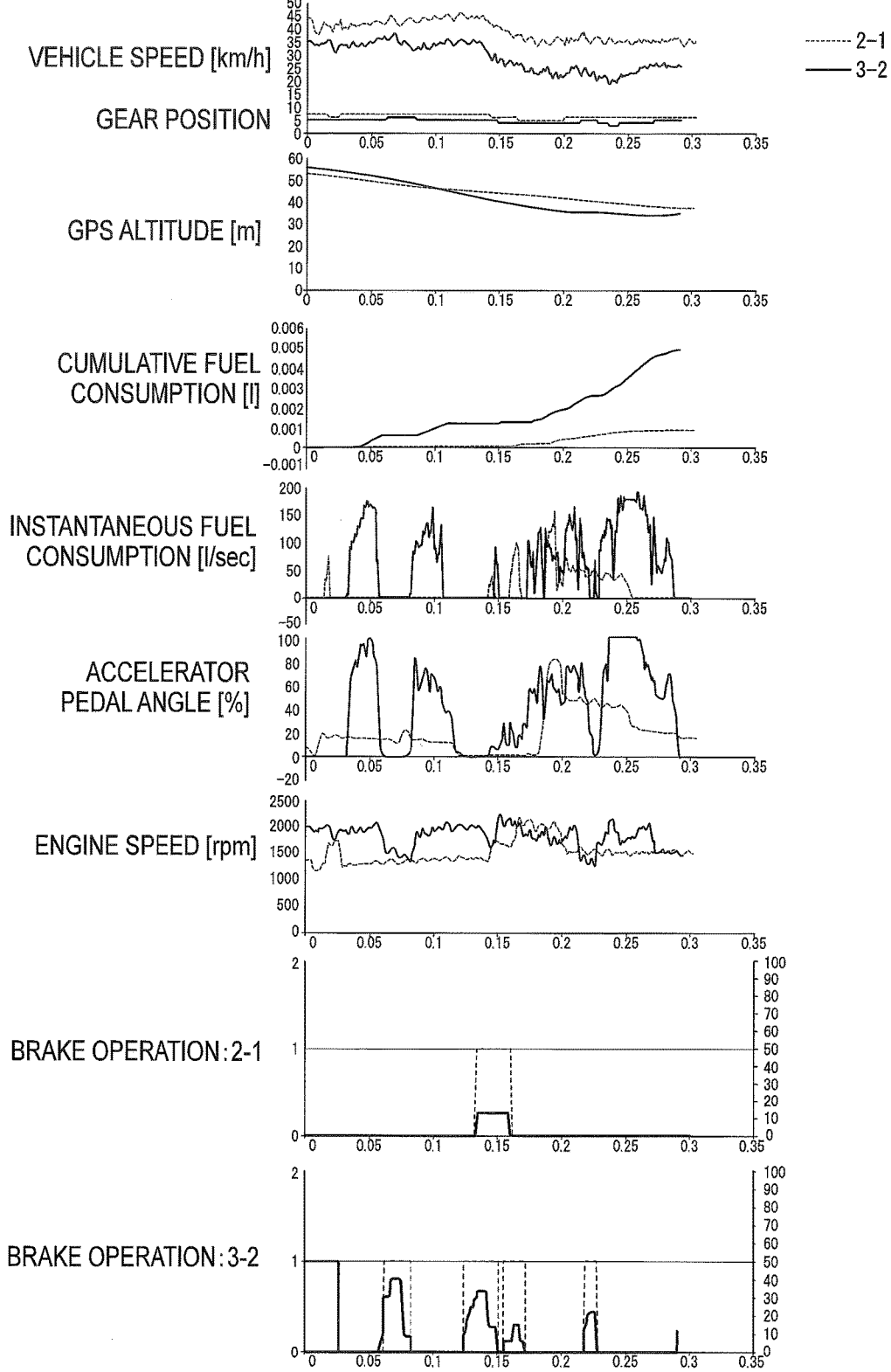
FIG. 12 shows a report indicating driving information of sections L16 and L17.

FIG. 12 shows the driving information of the dump truck 20 traveling from the downhill section L16 to the downhill section L17 in the loaded state. Similarly, in FIG. 12, the analysis-target cycle data set 3-2 is large in fuel consumption cumulative value as compared with the reference cycle data set 2-1. According to an analysis for investigating a cause of the above, it can be found that the brake and the accelerator are alternately pressed and thus the fuel is consumed.

Accordingly, based on the analysis of the report of the driving information of FIG. 12, the person in charge of analysis may advise the driver related to the analysis-target cycle data set 3-2 to use the auto retarder and set the vehicle speed at a corresponding average vehicle speed according to the reference cycle data set 2-1 to improve the fuel efficiency.

Incidentally, it should be understood that the scope of the invention is not limited to the above-described exemplary embodiment but includes modifications and improvements as long as the modifications and improvements are compatible with the invention.

Figure 13:
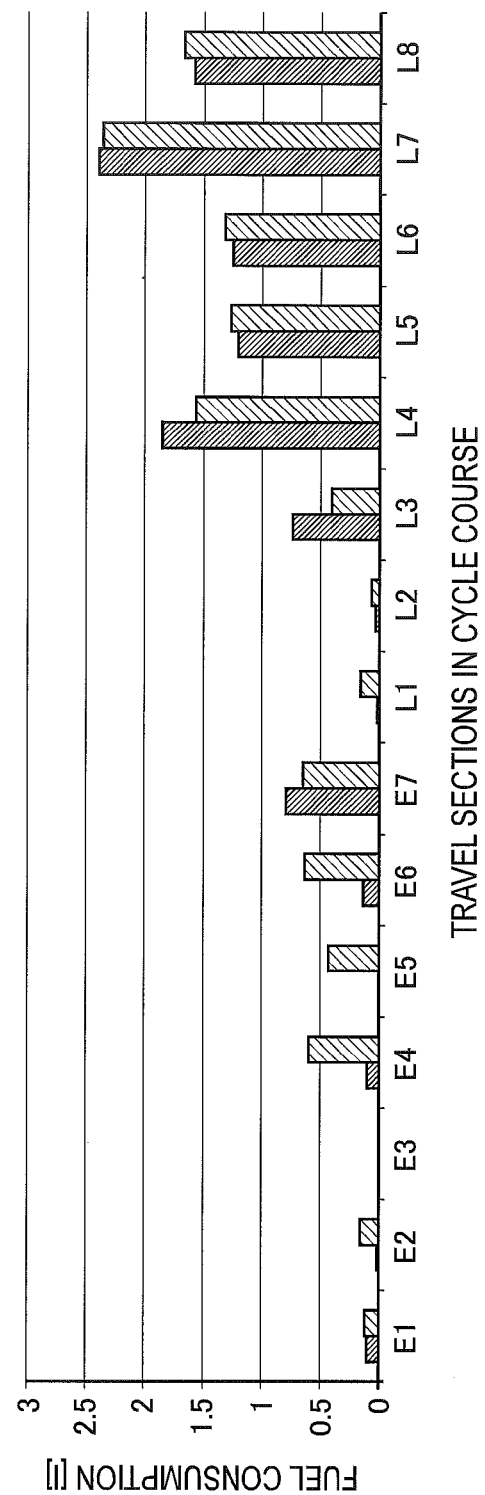
FIG. 13 is a graph showing an evaluation value per section according to a modification of the invention.
Figure 14:
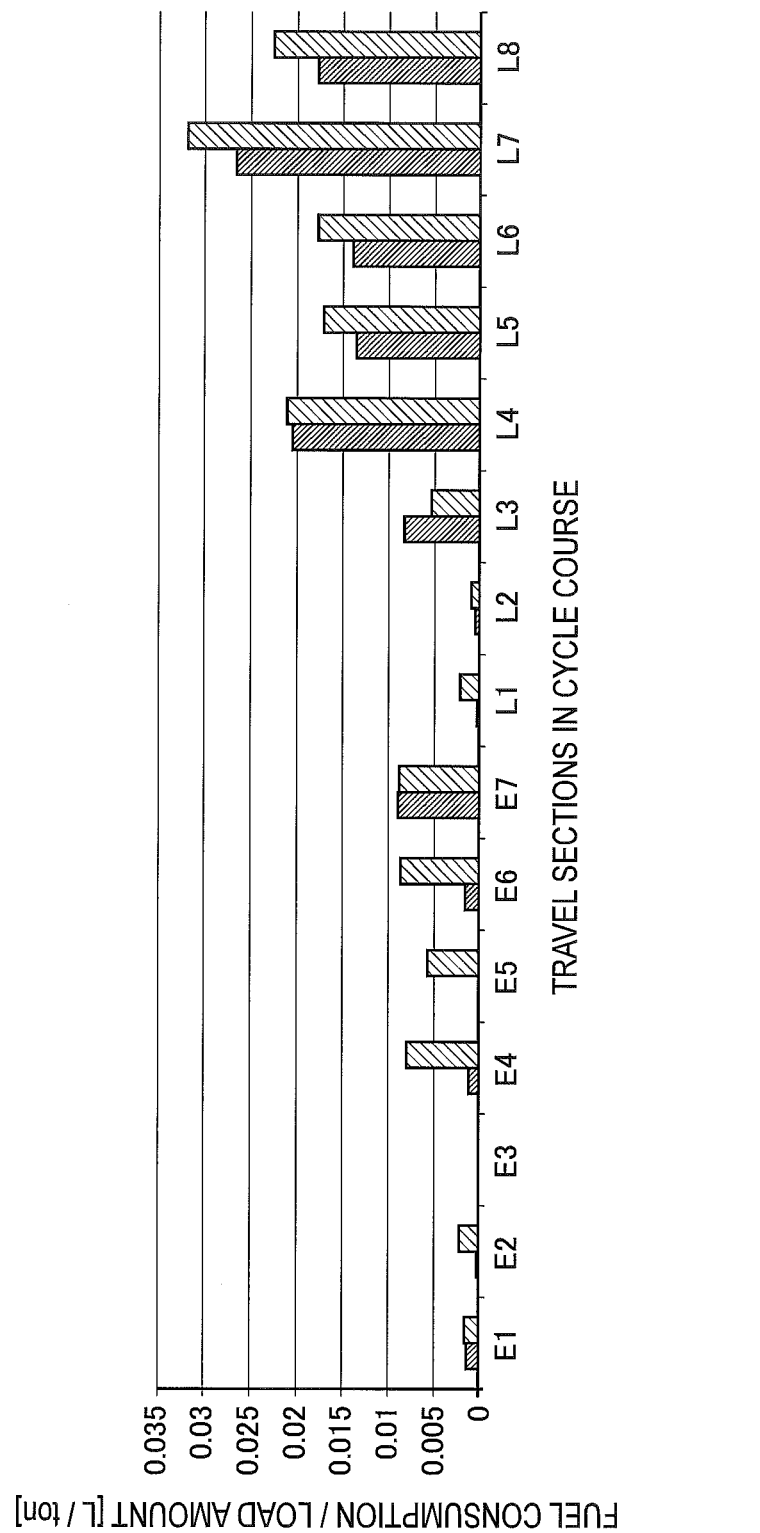
FIG. 14 is a graph showing an evaluation value per section according to another modification of the invention.

For instance, in the exemplary embodiment, the evaluation value calculator 53 uses a value of the fuel consumption/weight [L/ton] as the evaluation value, but the evaluation value may be a value of the fuel consumption [L (litter)] as shown in FIG. 13 or a value of the fuel consumption/load amount [L/ton] as shown in FIG. 14. Alternatively, the evaluation value may be a value of fuel consumption/total weight. The total weight is the sum of the vehicle weight and the load amount. In other words, any value may be used as the evaluation value as long as the evaluation value is a parameter variable with fuel consumption.

It should be noted that in the case where the evaluation value is a value of the fuel consumption/load amount or a value of fuel consumption/total weight, and is calculated from a load amount corresponding to the empty state (i.e., the dump truck 20 travels in the empty state), the evaluation value is increased due to a small dominator thereof and thus considerably different from the evaluation value obtained when the dump truck 20 is in the loaded state. Accordingly, the evaluation value is preferably calculated from a load amount corresponding to the loaded state even when the dump truck 20 is in the empty state.

It is not necessary for the section extractor 54 to compare the evaluation values per section and extract the analysis-target section based on a comparison result. For instance, a section likely to cause a difference in fuel efficiency (e.g., a section having a slope or a curve) may be extracted as the analysis-target section. It should be noted that whether or not a section has a slope may be determined based on a variation in the altitude included in the position information relative to the mileage. Similarly, whether or not a section has a curve may be determined, for instance, based on a variation in the latitude or longitude included in the position information relative to the mileage or based on handling.

In the exemplary embodiment, the data extractor 52 includes the three exclusion determining units 522, 523, 524, but may include only one or two thereof.

Specifically, in the case where one of the exclusion determining units 522, 523, 524 is provided, the cycle data extractor 525 may extract the reference cycle data set and the analysis-target cycle data set from the cycle data sets passing through the one of the exclusion determining units 522, 523, 524.

Similarly, in the case where two of the exclusion determining units 522, 523, 524 are provided, the cycle data extractor 525 may extract the reference cycle data set and the analysis-target cycle data set from the cycle data sets passing through the two of the exclusion determining units 522, 523, 524.

The data extractor 52 may include another exclusion determining unit that excludes one(s) of the cycle data sets not to be extracted as the analysis target(s) based on a condition different from those of the exclusion determining units 522,523,524. For instance, when various types of dump trucks 20 travel and the equipment of these dump trucks 20 is different depending on whether or not the ARSC function is installed, the dump trucks 20 may be sorted depending on whether the ARSC function is installed so that an analysis can be selectively made only on the dump trucks 20 with the ARSC function or on the dump trucks 20 without the ARSC function.

This is because advice based on a cause of an increased fuel consumption and/or an analysis result should be different depending on such a functional difference.

The data extractor 52 may include none of the exclusion determining units 522, 523, 524. In this case, the cycle data extractor 525 extracts the reference cycle data set and the analysis-target cycle data set from all the cycle data sets stored in the memory 60, so that, for instance, an unusual cycle data set with a load amount of approximately 50% of the maximum load amount can be extracted as the analysis target.

However, in order to give the driver of the dump truck 20 advice for fuel-saving driving, an analysis is preferably made on the cycle data sets of the dump trucks 20 traveling the same route R in the same conditions. Accordingly, an unusual data is preferably excluded by the exclusion determining units 522, 523, 524 as in the exemplary embodiment.

In the exemplary embodiment, the dump site DP is defined as the start and end of the route R. However, the invention is applicable to the case where the start and end of the route R are different (i.e., the outgoing route Rg and the return route Rr are different).

The invention is applicable not only to a dump truck but also to any other haulage vehicle as long as the haulage vehicle repeatedly travels the same route and is intended to usually carry substantially the same amount of a load substance.

The driving analyzer 10 according to the invention may be located at a place different from a management office in a mine or the like where the haulage vehicle works. For instance, the driving analyzer 10 may be provided to each of haulage vehicles so that when one of the haulage vehicles is driven by different drivers, the respective cycle data sets of the drivers can be compared per haulage vehicle. In this case, the driving information may be outputted to a monitor or the like provided to the haulage vehicle, or may be printed out by a serviceperson for maintaining the haulage vehicle so that the serviceperson can report an analysis result to a manager.

The invention claimed is:

1. A driving analyzer for a haulage vehicle configured to repeatedly travel a same route, the driving analyzer comprising:
    a data loader configured to acquire from an in-vehicle information collector a cycle data set each time when the haulage vehicle travels the route back and forth and store the cycle data set in a memory, the cycle data set being acquired for a plurality of times to be stored in a form of a plurality of cycle data sets, the cycle data set comprising:
        position information of the traveling haulage vehicle; and
        driving information comprising information about a fuel consumption per cycle and a carried load amount per cycle;
    a data extractor configured to extract a reference cycle data set and an analysis-target cycle data set from the plurality of cycle data sets stored in the memory;
    a section extractor configured to divide the route into a plurality of sections based on the position information and extract an analysis-target section from the plurality of sections; and
    a driving information output unit that is in connection with a data processor of the haulage vehicle and that is configured to output a part of the driving information regarding the analysis-target section according to each of the reference cycle data set and the analysis-target cycle data set.

2. The driving analyzer according to claim 1, wherein the data extractor extracts as the reference cycle data set one of the plurality of cycle data sets with a smallest value obtained by dividing the fuel consumption per cycle by the carried load amount per cycle.

3. The driving analyzer according to claim 1, further comprising an evaluation value calculator configured to calculate an evaluation value for fuel-saving driving on a basis of each of the plurality of sections divided from the route based on the position information, the evaluation value comprising a reference evaluation value calculated from the fuel consumption according to the reference cycle data set and an analysis-target evaluation value calculated from the fuel consumption according to the analysis-target cycle data set, wherein
    the section extractor compares the reference evaluation value and the analysis-target evaluation value on the basis of each of the plurality of sections, and extracts one of the sections that satisfies an extraction condition as the analysis-target section.

4. The driving analyzer according to claim 3, wherein the evaluation value calculated by the evaluation value calculator is any one of: a fuel consumption per section; a value obtained by dividing the fuel consumption per section by the carried load amount per cycle; and a value obtained by dividing the fuel consumption per section by a sum of a weight of the haulage vehicle and the carried load amount.

5. The driving analyzer according to claim 1, wherein the section extractor extracts one of the sections that comprises a slope divided from the route as the analysis-target section.

6. The driving analyzer according to claim 1, wherein the data extractor comprises a load-amount-based exclusion determining unit that is in connection with the data processor of the haulage vehicle and that is configured to exclude one of the cycle data sets not to be extracted, the carried load amount of the one of the cycle data sets being outside a predetermined range with reference to a maximum load amount of the haulage vehicle.

7. The driving analyzer according to claim 1, wherein
    the driving information further comprises a travel time per cycle spent to travel the route back and forth, and
    the data extractor comprises a travel-time-based exclusion determining unit that is in connection with the data processor of the haulage vehicle and that is configured to exclude one of the cycle data sets not to be extracted, the travel time of the one of the cycle data sets being outside a predetermined range with reference to an average travel time.

8. The driving analyzer according to claim 1, wherein
    the driving information further comprises a mileage per cycle accumulated to travel the route back and forth, and
    the data extractor comprises a mileage-based-exclusion determining unit that is in connection with the data processor of the haulage vehicle and that is configured to exclude one of the cycle data sets not to be extracted, the mileage of the one of the cycle data sets being outside a predetermined range with reference to an average mileage.

9. A driving analyzing method for a haulage vehicle configured to repeatedly travel a same route, the driving analyzing method comprising:
    acquiring a cycle data set from an in-vehicle information collector each time when the haulage vehicle travels the route back and forth;
    storing the cycle data set in a memory, the cycle data set being acquired for a plurality of times to be stored in a form of a plurality of cycle data sets, the cycle data set comprising:
        position information of the traveling haulage vehicle; and
        driving information comprising information about a fuel consumption per cycle and a carried load amount per cycle;
    extracting a reference cycle data set and an analysis-target cycle data set from the plurality of cycle data sets stored in the memory;
    dividing the route into a plurality of sections based on the position information;

extracting an analysis-target section from the plurality of sections; and outputting a part of the driving information regarding the analysis-target section according to each of the reference cycle data set and the analysis-target cycle data set.

10. The driving analyzer according to claim 1, wherein the driving information output unit is configured to output the part of the driving information regarding the analysis-target section according to each of the reference cycle data set and the analysis-target cycle data set to an external device.

11. The driving analyzer according to claim 6, wherein the load-amount-based exclusion determining unit is configured to compare the carried load amount and the maximum load amount of the haulage vehicle of the plurality of cycle data sets stored in the memory.

12. The driving analyzer according to claim 7, wherein the travel-time-based exclusion determining unit is configured to compare the travel time and the average travel time of the haulage vehicle of the plurality of cycle data sets stored in the memory.

13. The driving analyzer according to claim 8, wherein the mileage-based-exclusion determining unit is configured to compare the mileage and the average mileage of the haulage vehicle of the plurality of cycle data sets stored in the memory.

* * * * *